United States Patent Office 3,541,196
Patented Nov. 17, 1970

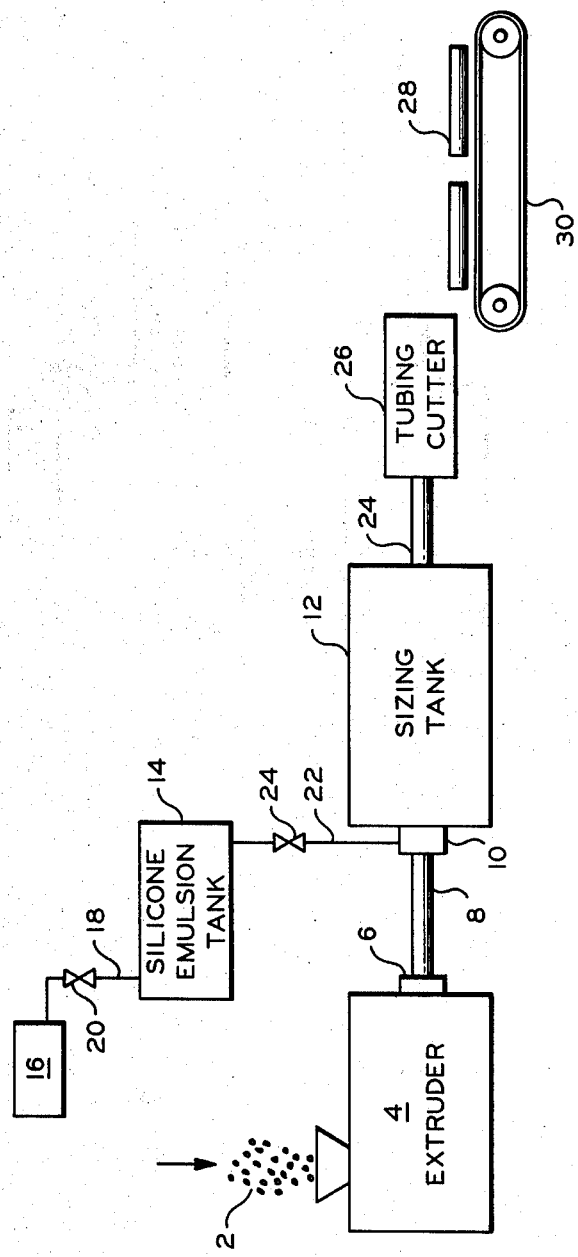

3,541,196
METHOD FOR FORMING SILICONE COMPOSITION COATED POLYOLEFIN ARTICLES
Dixie E. Gilbert, Bartlesville, Okla., assignor to Phillips Petroleum Company, a corporation of Delaware
Filed July 26, 1967, Ser. No. 656,281
Int. Cl. B29c *17/07;* B22b *31/16;* B44d *1/02*
U.S. Cl. 264—99                                7 Claims

ABSTRACT OF THE DISCLOSURE

A method of improving the optical clarity and resistance to gas permeation of articles produced from polyolefins. The polyolefin material is heated and a fluid silicone composition is applied in a continuous film to at least one surface of the heated material. The material is then shaped into an article. The fluid silicone composition has a viscosity greater than 10,000 centistokes and is applied in amounts equivalent to about 0.016 to about 1.6 grams of silicone per square foot of material surface. The material may be in parison form and shaped into an article by blow molding.

---

This invention relates to polyolefin articles. One aspect of this invention relates to an improved method for fabricating articles from polyolefins.

Containers produced from various plastics are rapidly making tremendous inroads into numerous packaging markets previously dominated by glass containers. Physical characteristics comparable to glass, such as resistance to a wide variety of chemicals, rigidity, etc., along with the important and added advantage of resistance to breakage, make plastic containers especially attractive for packaging various household goods and other consumer items. Poor optical clarity and permeability to liquids and gases are primary limitations to still additional application of plastic containers in the packaging field. Where high optical clarity and high resistance to liquid and gas permeability is desired, polyvinylchloride materials are presently widely used, especially for oxygen-sensitive liquids such as shampoos, hair-waving preparations, flavoring ingredients, and the like. Containers fabricated from polyolefins adaptable for many of these uses, especially for bottles blow-molded from extruded parisons, are desired by the industry because of various inherent advantages of the polyolefins such as lower material costs, ease of processing and lower density. Unfortunately, polyolefin containers fabricated by conventional methods exhibit poorer optical clarity and resistance to fluid permeability, particularly gas permeability, than those produced from polyvinylchloride materials and for these reasons are unacceptable for many packaging applications.

Currently, industry is extending considerable effort to perfect methods of fabricating containers from polyolefins having improved optical clarity and resistance to oxygen permeability. Various methods have been proposed to overcome the undesirable characteristics of polyolefins including applying a coating of another type of plastic or laminating a layer of another plastic, such as polyvinylchloride or polyvinylidene chloride, to a polyolefin base. Generally, these methods have proven to be either costly or not completely satisfactory, e.g., the resistance to oxygen permeability may be improved but the optical clarity is decreased or remains unacceptable for many applications.

I have discovered that, unexpectedly, both the optical clarity and resistance to fluid permeability of articles fabricated from polyolefins can be improved by simply applying a continuous, thin film of a silicone composition to the heated surfaces of the polyolefin prior to shaping into a container. In addition, the articles so produced have a very smooth, high gloss surface.

Accordingly, an object of this invention is to provide a method for fabricating articles from polyolefins having improved optical clarity.

Another object of this invention is to provide a method for fabricating atricles from polyolefins having improved resistance to fluid permeability.

A further object of this invention is to provide a simplified, inexpensive method for fabricating containers from polyolefins having improved optical clarity and resistance to fluid permeability which is readily adaptable to conventional shaping techniques.

Still further objects, advantages, and aspects of this invention will become readily apparent to those skilled in the art from the following detailed description, drawing, and appended claims.

According to this invention, the optical clarity and resistance to permeability of articles fabricated from polyolefins is increased by applying a thin, continuous film of a fluid silicone composition to the heated surface of the polyolefin prior to shaping.

The term "silicone," as employed herein, is used to designate well known organosiloxane polymers. These polymers are comprised essentially of silicone atoms connected to each other by oxygen atoms through silicone-oxygen linkages, i.e.

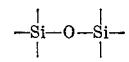

A wide variety of silicones, having various organic side chains such as methyl, ethyl, propyl, butyl, benzyl, tolyl, phenyl, carboxyalkyl, hydroxyalkyl, cyanoalkyl, and aminoalkyl, are well known and described in literature. The physical form of the silicone depends to a primary extent on the types of organic groups attached to the silicone atoms and the extent of cross-linkage between polymer molecules. The silicones which can be used in the practice of this invention should not contain either side groups or the degree of cross-linking that makes them insoluble in common hydrocarbon solvents such as xylene, toluene, methylethylketone, carbon tetrachloride and the like because an effective, uniformly distributed film cannot be applied to the heated surfaces of the polyolefin. For example, some of the organic substituents, such as fluoroalkyl groups, cannot be used because the resultant polymers are insoluble in solvents.

The fluid silicone compositions which can be used in the practice of this invention preferably should have low enough surface tension and high enough viscosity so that the fluid composition will rapidly wet and completely distribute as a film over the entire heated surface of the polyolefin; capability of being used without a substantial change in viscosity, thermal decomposition, or oxidation in the temperature range of the heated polyolefin being treated so that there is no build up of carbonaceous material during processing which can damage the surface of the finished article; and an incompatibility with the polyolefin being treated so that there is minimum drag during passage of the heated polyolefin through various processing equipment. Generally, the temperature range of the heated surface of the polyolefins being treated in accordance with this invention will be in the temperature range of 200 to 600° F.

The fluid silicone compositions used can be in the form of a 100 percent silicone fluid, emulsions or solvent solutions of silicone fluids, aqueous emulsions of resinous silicones, resinous silicones dispersed in solvents or other suspending medium or silicone fluids thickened with various types of fillers.

Silicone compositions commonly used as mold release products are especially adaptable for use in the practice of this invention. These compositions include 1 to 100 volume percent silicone fluids, preferably 10 to 60 volume percent, emulsified in water or other liquids; silicone solutions comprising a high viscosity silicone resin dissolved in a petroleum solvent; and solutions comprising silicone greases dissolved in solvents, such as trichloroethylene. Diluents, such as water and aliphatic or aromatic hydrocarbon solvents, can be added to some of these compositions to obtain the fluidity necessary so that a film of the fluid silicone composition can be readily applied to and evenly distributed over the surface of the polyolefin.

Silicone fluids are also especially adaptable for the practice of this invention because of their excellent thermal and oxidation stability, low surface tension, and chemical inertness. Various silicone fluids may be used separately or may be blended to obtain the viscosity necessary for a rapid and complete distribution over the surface of the polyolefin being treated.

If desired, the fluid silicone compositions can be thickened with various types of fillers as indicated above. A wide variety of filler materials, either inorganic or organic, can be employed. The only requirements are that the filler materials should be essentially chemically inert with respect to the silicone, be substantially insoluble in the solvent or emulsifying agent being used, be of small enough size not to adversely affect the surface of the polyolefin, preferably 5 microns or smaller, and be sufficiently heat resistant to withstand the temperature of the heated polyolefin being treated. Representative examples of fillers which can be used include silica, lithium, soap, carbon black and arylurea compounds.

Fluid silicone compositions having a wide range of viscosities can be used. Generally, in order to obtain the required rapid and complete distribution of a continuous film of the silicone on the surface of the polyolefin, the silicone composition used must have a reasonably high viscosity, preferably greater than 10,000 centistokes.

The organosiloxanes can be prepared in a number of ways, all known in the art. For example, the preparation of methylpolysiloxane is described in U.S. Pat. 2,258,218. The preparation of ethylpolysiloxane is described in U.S. Pat. 2,258,220 and other methods of preparing organosiloxane polymers are described in U.S. Pat. 2,494,920.

The fluid silicone composition can be applied to the polyolefin in any suitable manner and means whereby a thin, continuous film of the silicone is distributed over the heated surface of the polyolefin prior to shaping. The fluid silicone composition can be applied to one surface only or to both surfaces, preferably to both surfaces. The fluid silicone composition can be applied to the heated surface(s) of the polyolefin manually such as by brushing, spraying or other application means or can be applied by conventional mechanical means, such as lubricating oil rings, at various stages of processing. For instance, in shaping processes where the polyolefin is first extruded into a sheet or parison, the silicone composition can be applied to the surfaces of the molten polyolefin during the extruding operation by lubricating devices internal to the extruding equipment. Lubricating devices such as those disclosed in U.S. Pats. 2,597,553 and 2,688,153 are representative examples of lubricating devices which can be used to apply the silicone compositions to the outer and/or inner surfaces of a parison during the extrusion operation.

Where the polyolefin is first formed into a parison, cooled and then subsequently blow-molded into a container, the silicone composition can be applied to the surface(s) of the parison during the extrusion operation, during the initial shaping of the parison prior to cooling, or after the parison has been heated but prior to the blow-molding operation. In thermoforming processes, the silicone composition can be applied during the sheet extrusion operation or after the sheet has been heated prior to the forming operation. The important limitation is that the silicone composition be applied the heated surface(s) of the polyolefin prior to the final shaping into an article.

The fluid silicone composition is applied in an amount sufficient to obtain a continuous film of the silicone composition on the surface(s) of the polyolefin. As will be recognized by those skilled in the art, the amount of the fluid silicone composition necessary to obtain a continuous film on the heated surface of the polyolefin depends upon many factors such as the specific polyolefin being used, the temperature of the surface, the type of fluid silicone composition being used, the rate of linear motion of the polyolefin (when applied in a continuous process) and the like. Generally, the fluid silicone composition should be applied in quantities equivalent to about 0.016 to 1.6 grams of the silicone per square foot, preferably 0.16 to .96 gram per square foot, of the heated polyolefin surface. For example, if a fluid silicone composition comprising a silicone fluid emulsion solution made up of 35 weight percent silicone fluid and 65 weight percent emulsifier and diluent, then the general range of the amount of the fluid silicone composition applied would be about 0.046 to 4.6 grams per square foot of surface. Excessive amounts of the fluid silicone composition should not be added when added in a continuous process, such as during extruding, because of the tendency to increase drag between the polyolefin and the process equipment which causes surface damage.

Many fluid silicone compositions commercially available have been sanctioned by the Food and Drug Administration for use in food-oriented applications. These sanctioned compositions should be used for this type application.

The term "polyolefin" as used herein refers to normally solid polymers of 1-olefin hydrocarbons. The term "polymer" is used to designate either homo- or copolymers, or blends thereof. This invention is especially effective with polymers of 1-olefins having 2 through 8 carbon atoms per molecule. Representative examples of 1-olefins to obtain such homopolymers include ethylene, propylene, butene-1, pentene-1, 4-methylpentene-1, hexene-1, heptene-1, octene-1 and the like. Representative examples of copolymers of two or more of such olefins include copolymers of ethylene and propylene, ethylene and butene-1, propylene and butene-1, ethylene and hexene-1, propylene and octene-1, ethylene and 4-methylpentene-1, ethyl and octene-1, hexene-1 and octene-1, and the like.

For a better understanding of this invention, reference is made to the drawing which is a schematic representation of an exemplary system for applying a silicone composition to the surfaces of a polyolefin tubing extrudate. Polyolefin pellets 2 are introduced into extruder 4 wherein the pellets are heated to their molten state and extruded through extruder die head 6. Extruder die head 6 is a conventional die for forming a tubular extrudate. The polyolefin extrudate 8 is passed from die head 6 through sizing ring 10 into vacuum sizing tank 12, wherein the extrudate is cooled. A silicone solution, such as a silicone fluid-in-water emulsion, is passed from supply tank 14, which is pressurized by a compressed gas, such as air or nitrogen, from vessel 16 through line 18 and regulator 20, through line 22 and control valve 24 into sizing ring 10. Gravity flow can also be used by pumping the silicone fluid into the elevated container. Sizing ring 10 contains an annular passage and a plurality of small orifices (both of which are not shown) through which the silicone solution flows onto and is evenly distributed over the surface of extrudate 8. Alternately, a smooth surfaced sizing ring is used and solution applied as extrudate enters the ring. Control valve 24 is adjusted to obtain the desired flow of the silicone solution through the orifices on the surface of the extrudate. The cooled, silicone-treated extrudate 24 is withdrawn from sizing tank 12 and passed into tubing cutter 26 where it is cut into desired parison lengths. Parisons 28 are transferred by conveyor 30 for packaging, storing, or to blow-molding equipment for shaping into containers, or the like. The silicone solution can also be applied to the inside surface of extrudate 8 through the tube-forming mandrel (not shown) in extruder die head 6 by a conventional lubricating device such as that disclosed in U.S. 2,597,553.

Articles produced in accordance with this invention do not exhibit any significant difference from those produced from untreated polyolefins relative to label adhesion. As with untreated polyolefins, the surface of the article can be subjected to conventional flame, corona discharge, and oxidizing acid treatments to obtain the desired label adhesion.

This invention is especially adaptable to the manufacture of bottles but can be used in the manufacture of any container or article from polyolefins where optical clarity, smooth, high gloss finish, or resistance to gas permeation is desired.

The following examples are presented to further illustrate the objects and advantages of this invention and are not to be construed as limiting the same thereto.

EXAMPLE I

A system similar to that shown in the drawing was used for treating the outside surface of polypropylene tubing. Supply tank 14 contained General Electric SM-61 silicone emulsion, an emulsion comprising approximately 35 volume percent methyl silicone fluid in water. Polypropylene pellets having a melt flow of 1.0 dg./min. (ASTM D–1238–62T, Condition L) and a density of 0.905 g./cc. (ASTM D–1505–63T) were introduced into extruder 4, heated to approximately 425° F., and extruded as 24 mm. diameter tubing with 0.150 inch wall thickness. The pressure in supply tank 14 and valve 24 was adjusted so that the flow of the silicone emulsion from supply tank 14 through line 22 was sufficient to form a continuous film of the silicone emulsion on the outside surface of the polypropylene tube extrudate 8 as it passed through sizing ring 10 into vacuum sizing tank 12. The amount of the silicone emulsion added was approximately 0.57 gram per square foot of the parison surface treated. The treated, cooled tubing was cut into 4-inch long parisons. The parisons were placed into a bottle blow-molding device and heated to approximately 330° F. and then blown into 7-ounce bottles. Untreated parisons were blown into 7-ounce bottles in the same manner as above. The two types of bottles were tested for gas permeability by pressurizing with oxygen gas and measuring the volumetric rate of oxygen permeating through the walls expressed as cc./24 hrs./100 in.$^2$/mil/atm. (same units as shown by ASTM D–1434–63). The average oxygen permeability expressed in the above units was 168 for three bottles produced from the untreated parison and 117 for three bottles produced from silicone-treated parisons.

From these data it can be seen that the bottles produced from the silicone-treated polypropylene parisons had an average oxygen permeability rate nearly 30 percent less than the untreated parison.

EXAMPLE II

Portions of bottles produced from untreated and silicone-treated polypropylene parisons made in accordance with the procedure of Example I were used as specimens to determine the percent of haze with a Pivotable-Sphere Haze Meter made by H. A. Gardner Laboratories, Bethesda, Md., in accordance with ASTM D–1003–61 (Procedure A). The percent of haze for a glass cover slide was determined in the same manner for comparison purposes. The calculated percent of haze was 32 percent for the specimen of a bottle produced from an untreated parison, 11 percent for the specimen of a bottle produced from a silicone-treated parison, and 1.3 percent for the glass cover slide.

From these data it can be seen that the optical clarity of a bottle produced from the parison treated in accordance with this invention is substantially better than that produced from an untreated parison.

EXAMPLE III

Portions of bottles produced from untreated and silicone-treated polypropylene parisons made in accordance with the procedure of Example I were used as specimens to determine the 60° specular gloss with a Gardner Color Difference Meter and the percent gloss relative to a perfect mirror value calculated. The same tests were performed on a glass cover slide for comparison purposes. The average calculated percent gloss for several specimens was 10 to 12 percent for the specimens of bottles produced from an untreated parison, 26 to 35 percent (most in the range of 32 to 35 percent) for the specimens of bottles produced from a silicone-treated parison and 41 percent for the glass covered slide.

From these data it can be seen that an article produced from a polyolefin treated in accordance with this invention has vastly improved gloss over an untreated polyolefin; in fact, the gloss approaches that of glass.

As will be evident to those skilled in the art, various modifications and alterations can be made to this invention in view of the foregoing disclosure without departing from the spirit or scope thereof.

I claim:

1. A method for surface-treating a polyolefin polymer comprising heating said polyolefin; applying a continuous film of a fluid silicone composition to at least one heated surface of said polyolefin material prior to shaping said polyolefin material into an article in an amount sufficient to improve the optical clarity and resistance to fluid permeation of said article produced therefrom; and shaping said treated polyolefin into an article, wherein said amount of said fluid silicone composition is equivalent to about 0.016 to about 1.6 grams of silicone per square foot of said surface of said polyolefin polymer being treated and wherein said fluid silicone composition has a viscosity greater than 10,000 centistokes.

2. The method according to claim 1 wherein said fluid silicone composition is a silicone fluid emulsion.

3. The method according to claim 1 wherein said polyolefin material comprises at least one normally solid polymer of 1-olefins having 2 through 8 carbon atoms per molecule.

4. The method according to claim 3 wherein said polymer is polypropylene.

5. A process according to claim 1 wherein said shaping is carried out by blow-molding said coated polyolefin into an article.

6. A method for surface-treating a polypropylene parison which is to be shaped into container form comprising heating said parison; applying continuous film of a silicone fluid emulsion to at least one surface of said parison, while said parison is still heated prior to shaping into container form, in an amount sufficient to improve the optical clarity and resistance to fluid permeation of said container; and shaping said treated parison into container form, wherein said amount of said silicone fluid is equivalent to about 0.016 to 1.6 grams of silicone per square foot of said surface of said parison and wherein the viscosity of said silicone fluid emulsion is greater than 10,000 centistokes.

7. A process according to claim 6 wherein said shaping is carried out by blow-molding said coated parison into a container form.

References Cited

UNITED STATES PATENTS

| 3,187,752 | 6/1965 | Glick. | |
|---|---|---|---|
| 3,312,762 | 4/1967 | Wechsler et al. | 264—131 X |
| 3,449,479 | 6/1969 | Cines | 264—92 |
| 3,453,248 | 7/1969 | Gowdy et al. | |

ROBERT F. WHITE, Primary Examiner

J. H. SILBAUGH, Assistant Examiner

U.S. Cl. X.R.

117—95, 138.8, 161; 264—134